United States Patent
Alexander

(10) Patent No.: US 10,792,848 B2
(45) Date of Patent: Oct. 6, 2020

(54) SYSTEMS AND METHODS TO FABRICATE AN INJECTION MOLDED PIECE WITH A WEAKENED PORTION

(71) Applicant: Ford Global Technologies, LLC, Dearborn, MI (US)

(72) Inventor: Jacob Alexander, Greenvale (AU)

(73) Assignee: Ford Global Technologies LLC, Dearborn, MI (US)

( * ) Notice: Subject to any disclaimer, the term of this patent is extended or adjusted under 35 U.S.C. 154(b) by 639 days.

(21) Appl. No.: 15/605,492

(22) Filed: May 25, 2017

(65) Prior Publication Data

US 2017/0355120 A1 Dec. 14, 2017

(30) Foreign Application Priority Data

Jun. 14, 2016 (CN) .......................... 2016 1 0416237

(51) Int. Cl.
| | | |
|---|---|---|
| B29C 45/00 | (2006.01) | |
| B29C 45/17 | (2006.01) | |
| B29C 45/56 | (2006.01) | |
| B29L 31/30 | (2006.01) | |

(52) U.S. Cl.
CPC ........ *B29C 45/174* (2013.01); *B29C 45/0081* (2013.01); *B29C 45/1732* (2013.01); *B29C 45/5675* (2013.01); *B29L 2031/3008* (2013.01); *B29L 2031/3038* (2013.01); *B29L 2031/3041* (2013.01)

(58) Field of Classification Search
CPC .............. B29C 45/174; B29C 45/0081; B29C 45/5675; B29L 2031/3038

USPC ........................................ 264/85, 328.1, 163
See application file for complete search history.

(56) References Cited

U.S. PATENT DOCUMENTS

| | | | |
|---|---|---|---|
| 5,704,639 A | 1/1998 | Cundill et al. | |
| 5,972,276 A * | 10/1999 | Yasuda | B29C 45/174 264/500 |
| 6,062,590 A | 5/2000 | Gallagher | |
| 6,403,014 B1 * | 6/2002 | Hendry | B29C 45/174 264/101 |
| 6,423,933 B2 | 7/2002 | Nicholas et al. | |
| 6,432,350 B1 * | 8/2002 | Seres | B29C 45/174 264/500 |
| 6,808,197 B2 | 10/2004 | Bauer et al. | |
| 7,556,264 B2 | 7/2009 | Riha et al. | |
| 2005/0147476 A1 | 7/2005 | Wieners | |
| 2006/0163775 A1 * | 7/2006 | Kroell | B29C 45/5675 264/293 |

(Continued)

*Primary Examiner* — Christina A Johnson
*Assistant Examiner* — Xue H Liu
(74) *Attorney, Agent, or Firm* — David Coppiellie; Kolitch Romano LLP

(57) ABSTRACT

A method is provided to fabricate an injection molded piece with a weakened portion in an injection molding system having a cavity defined by a fixed mold part and a moveable mold part. The method comprises injecting raw material in a liquid state into the cavity to form the injection molded piece; moving a weakening insert into the injection molded piece from a first surface of the injection molded piece; injecting a gas to the first surface of the injection molded piece with a controlled pressure, wherein moving the weakening insert into the injection molded piece and injecting the gas are performed while the injection molded piece is in the liquid state.

14 Claims, 6 Drawing Sheets

(56) References Cited

U.S. PATENT DOCUMENTS

2010/0252962 A1\* 10/2010 Ueha .................. B29C 45/174
264/500

\* cited by examiner

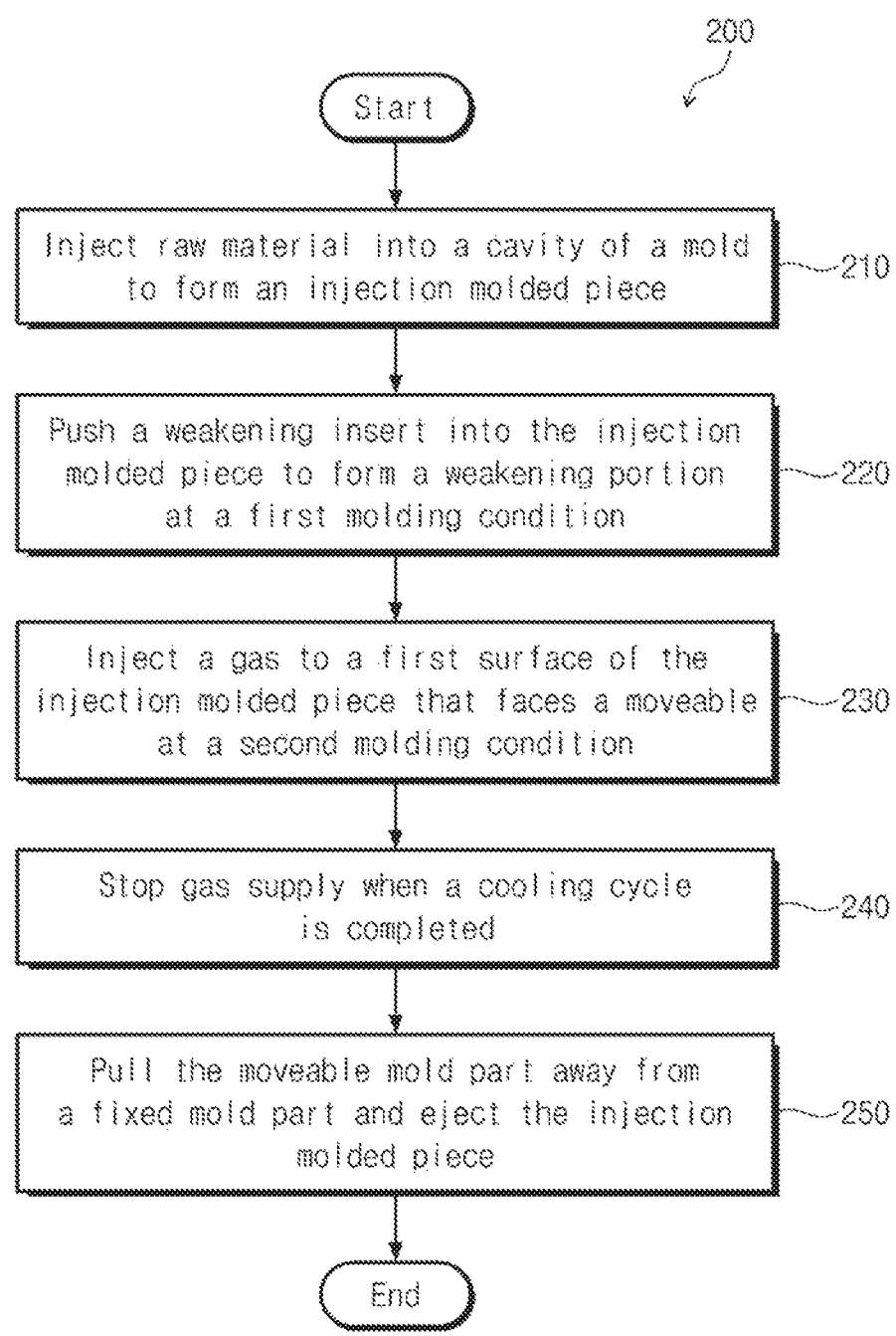

SYSTEMS AND METHODS TO FABRICATE AN INJECTION MOLDED PIECE WITH A WEAKENED PORTION

RELATED APPLICATION

This application claims the benefit of Chinese Patent Application No.: CN 201610416237.7 filed on Jun. 14, 2016, the entire contents thereof being incorporated herein by reference.

FIELD

This disclosure relates to systems and methods to fabricate a piece with a weakened portion in an injection molding process, specifically relates to systems and methods to fabricate a piece with a weakened portion in an injection molding process without objectionable surface defects.

BACKGROUND OF THE INVENTION

Airbag systems are used in nearly all of the vehicles to protect passengers from serious injury upon collision. The airbag systems are integrated into various locations in the vehicles to provide impact protection and roll-over protection. For example, airbag systems are integrated into the hub of a steering column for forward impact protection for the driver, into an instrument panel for protection of the front seat passengers, into seats and door panels for side protection, and into a headliner, pillar trims and quarter panels for roll-over protection. The airbag systems are usually concealed by an airbag cover that is indistinguishable from the surrounding environment such as a plastic trim. To provide deployment of an air bag, a weakened portion is formed on an airbag cover. The weakened portion on the air cover is usually made by a secondary operation such as laser or milling after the part having the airbag cover is injection molded in a molding tool. U.S. Pat. No. 7,556,284 discloses that the weakened portion may be formed as part of the injection molding process through the inclusion of sharp mold segments (blade) in the mold core which project through the substrate and are encapsulated by the flow of the polymer around these blades.

However, the inventor has recognized some issues with the injection molding process described in the U.S. Pat. No. 7,556,284. Specifically, a visible surface of the part including the air bag cover will have visible marking due to flow marks caused by the resistance of the flow at the thinner area, weld lines formed by the two melt fronts around the weakening groove and sink marks caused by the different in shrinkage due to the variation in thickness at the section. As a result, the part made from such process may not meet visual acceptance standards and may have inconsistency in strength due to the weld line.

SUMMARY

According to one aspect of the present disclosure, a method is provided to fabricate an injection molded piece with a weakened portion in an injection molding system having a cavity defined by a fixed mold part and a moveable mold part. The method comprises injecting raw material in a liquid state into the cavity to form the injection molded piece; moving a weakening insert into the injection molded piece from a first surface of the injection molded piece; and injecting a gas to the first surface of the injection molded piece with a controlled pressure. The first surface may face the moveable mold part. The method may include moving the weakening insert into the injection molded piece and injecting the gas are performed while the injection molded piece is in the liquid state.

In one embodiment, the raw material is plastic and the gas is an inert gas.

In another embodiment, the gas may be injected to the first surface of the injection molded piece via a plurality of valve pins disposed on a core of the moveable mold part, and a time to move the weakening part and a time to inject the gas may be the same or different. The gas may apply a force to a second surface of the injection molded piece that is opposite to the first surface.

According to another aspect of the present disclosure, a method is provided to fabricate an injection molded piece with a weakened portion in an injection molding system having a cavity defined by a fixed mold part and a moveable mold part. The method comprises injecting raw material in a liquid state into the cavity of a mold to form the injection molded piece; pushing a weakening insert into the injection molded piece to form the weakened portion at a first molding condition; and injecting a gas to a first surface of the injection molded piece at a second molding condition. The first surface may face a moveable part of the mold.

In one embodiment, the weakening insert may be coupled to the moveable part of the mold, and may be pushed into the injection molded piece by an actuator.

In another embodiment, at the first molding condition, the injection molded piece may be at the liquid state and may have a first temperature. At the second molding condition, the injection molded piece may be at the liquid state and may have a second temperature.

In another embodiment, the first temperature may be the same as the second temperature.

In another embodiment, the first temperature may be higher than the second temperature.

In another embodiment, the method may further comprise stopping the gas injection after a cooling cycle is completed, pulling the moveable mold part away from the fixed mold part, and ejecting the injection molded piece by a core pull and push device.

In another embodiment, the weakening insert may create a continuous groove or a plurality of slots on the first surface to form the weakened portion.

In another embodiment, the gas may be a nitrogen. The gas may be injected as a thin layer on the first surface of the injection molded piece and apply a force to a second surface of the injection molded piece that faces the first surface.

In another embodiment, the gas may be injected by a plurality of valve pins disposed on a specific area on a core of the moveable mold part.

In another embodiment, the method may include controlling the gas pressure substantially constant in the cavity during gas injection. The gas pressure may be controlled by a controller via a valve upstream of the valve pins.

In another embodiment, the method may include controlling the gas pressure in the cavity at a first pressure at a first gas injection stage and controlling the gas pressure in the cavity at a second pressure at a second gas injection stage. The gas pressure may be controlled by a controller via a valve upstream of the valve pins.

In another embodiment, the injection molded piece may be an instrument panel in a vehicle and the weakened portion may be configured for airbag deployment.

In another embodiment, the injection molded piece may be a trim piece in a vehicle and the weakened portion may be configured for airbag deployment.

According to another aspect of the present disclosure, an injection molding system is provided to fabricate an injection molded piece with a weakened portion. The injection molding system may comprise a fixed mold part; a moveable mold part including a core and a core pull and push device to move the core; a cavity defined by the fixed mold part and the moveable mold part when the moveable mold part contacts the fixed mold part; a weakening insert disposed on the core and moveable by an actuator; an external gas system to supply a gas to the cavity; and a controller to control an insertion of the weakening insert and a gas injection to the cavity in response to a molding condition.

In one embodiment, the external gas system includes a valve upstream of a gas inlet to the cavity and a plurality valve pins disposed on a specific area of the core. The plurality of valve pins are communicated fluidly with the external gas system and configured to inject gas to the injection molded piece in the cavity.

In another embodiment, the controller may be configured to maintain a substantially constant pressure via the valve in the external gas system.

In another embodiment, the valve pins may be disposed on a surface of the core and may face the fixed mold part.

In another embodiment, the injection molding system may further comprise a raw material supply system to provide the raw material into the cavity.

During the molding process, the gas applies pressure to the first surface of the injection molded piece while it is in the liquid state or when the molding is in the cooling cycle, and forces the injection molded piece against a visible surface opposite the weakening portion. Proper control of an insertion of the weakening insert and a gas injection on the molded piece can ensure that appropriate force is applied to the injection molded piece to reduce or eliminate the imperfection caused by the insertion of the weakening insert and other imperfection on the visible surface. For example, the gas pressure may bias the sinks and thus eliminating surface imperfections on the visible surface due to thickness variations caused by the weakening insert.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

FIG. 7 is a flowchart of a method to fabricate an injection molded piece with a weakened portion in a molding system according to an example embodiment of the present disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the present disclosure will now be described more fully with reference to the accompanying drawings, in which example embodiments are shown. Example embodiments of the present disclosure may, however, be embodied in many different forms and should not be construed as being limited to the embodiments set forth herein; rather, these embodiments are provided so that this disclosure will be thorough and complete, and will fully convey the concept of example embodiments to those of ordinary skill in the art.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising". "includes" and/or "including," if used herein, specify the presence of stated features, integers, steps, operations, elements and/or components, but do not preclude the presence or addition of one or more other features, integers, steps, operations, elements, components and/or groups thereof.

Figure 1:
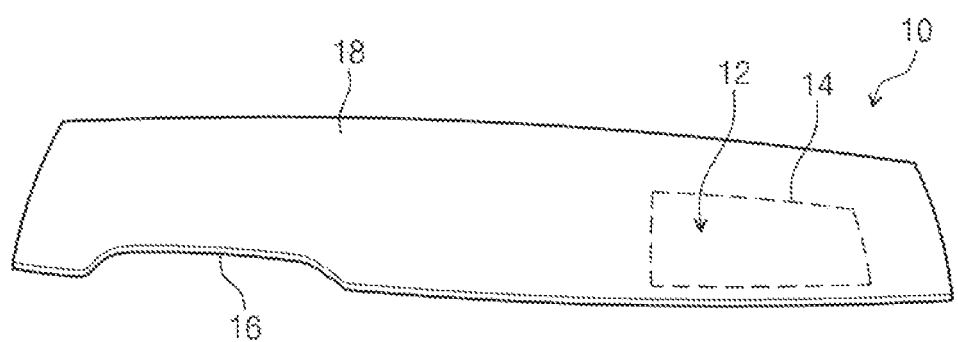
FIG. 1 is a perspective view of an example instrument panel, illustrating a weakened portion for an air bag deployment.

FIG. 1 schematically shows an example instrument panel 10 having a weakened portion for an airbag deployment. The instrumental panel 10 may be installed below a windshield of a front window of a vehicle. An airbag system (not shown) may be disposed under an airbag door 12 that may be defined by a weakened portion 14. The weakened portion 14 allows the airbag door 12 to break from the instrumental panel 12 without fragmentation under the pressure of the inflating airbag during a collision.

The instrument panel 10 may be injection molded and the weakened portion 14 may be formed on a bottom surface 16 so that it is invisible and does not affect an integral appearance of the instrument panel 10. It is desirable that an upper surface or a visible surface 18 of the instrumental panel 10 has minimum imperfection or no imperfection despite the formation of the weakened portion 14 on the opposite bottom surface 16. The weakened portion 14 may be formed by an injection molding process as described below.

FIG. 1 shows the weakened portion located under an instrumental panel for the airbag deployment to protect a front seat passenger. It should be appreciated that airbags may be disposed in various locations in the vehicle. The vehicle pieces or the vehicle panels including a weakened portion for the airbag deployment may include, but not limited to, pillar trims, a headliner, seats, door panels, quarter panels, and roof rails. The system and method of the present disclosure may be used to fabricate the vehicle pieces having a weakening portion. It should be appreciated that the systems and methods of the present disclosure may be used to fabricate the pieces requiring a weakening portion other than the vehicle pieces.

Figure 2:
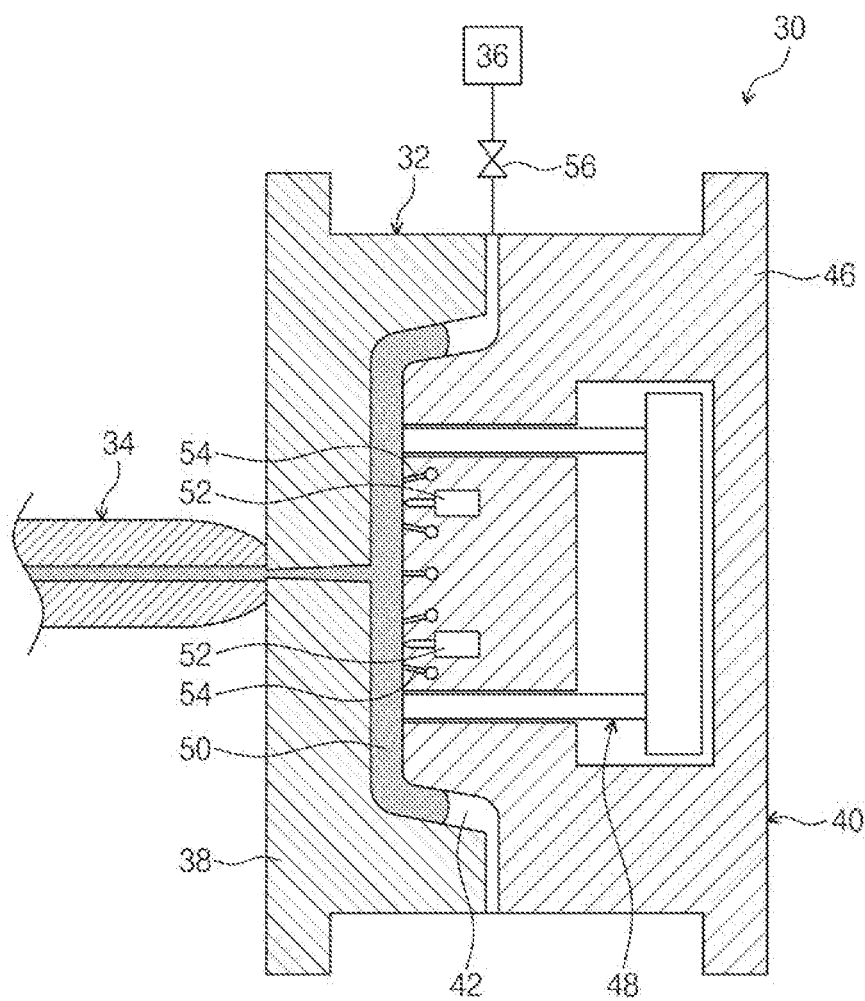
FIG. 2 is a cross-sectional view of an example injection molding system, illustrating a raw material injection process.
Figure 3:
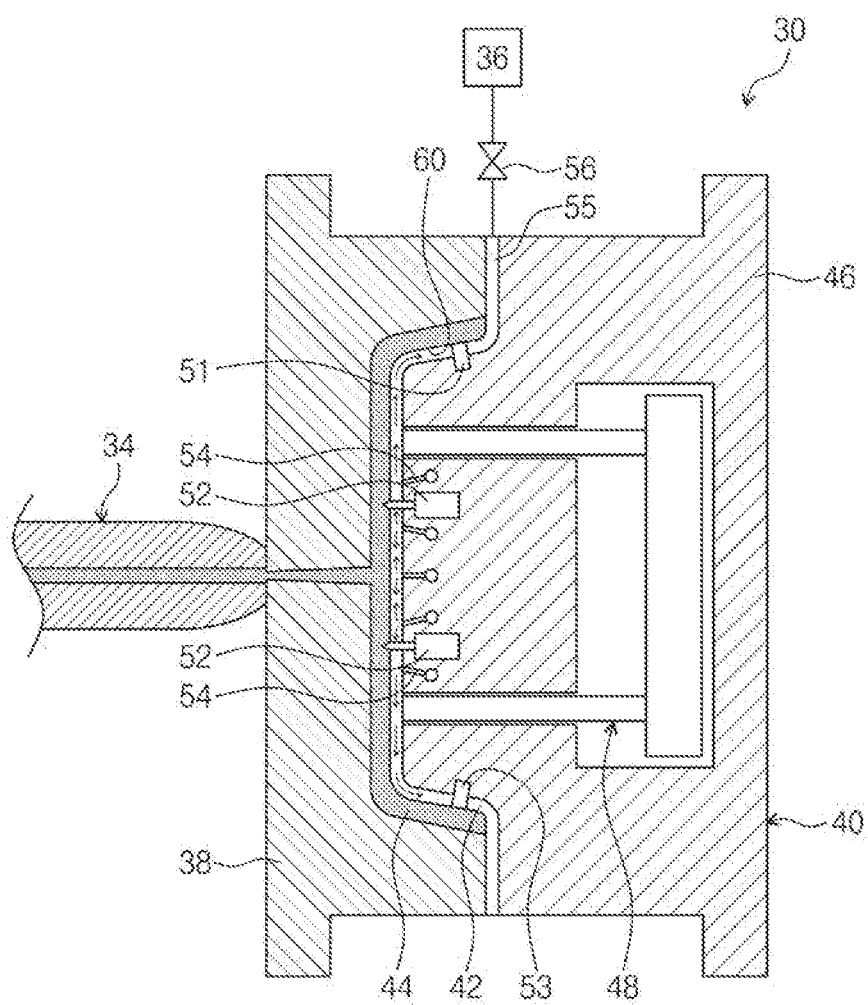
FIG. 3 is a cross-sectional view of the example injection molding system in FIG. 2, illustrating a gas injection process.

FIG. 2 is a cross-sectional view of an example injection molding system 30, illustrating an example raw material injection process of the present disclosure. FIG. 3 is a cross-sectional view of the example injection molding system in FIG. 2, illustrating a gas injection process. As shown in FIG. 2 and FIG. 3, the injection molding system 30 may include a mold 32, a raw material supply system 34 and an external gas system 36. The mold 32 may include a fixed mold part 38 and a moveable mold part 40, and a cavity 42 defined by the fixed mold part 38 and a core 46 of the moveable part 40. The cavity 42 may correspond to a shape of an injection molded piece 44. The moveable mold part 40 may include a core pull and push device (not shown). Before a molding process, the core 46 may be pulled toward the fixed mold part 38 to form the cavity 42 by the core pull and push device. In some embodiments, after the completion of the molding process, the injection molded piece 44 and the moveable mold part 40 may be pulled away from the fixed mold part 38 and the injection molded piece 44 may be ejected from the core 46 by an ejection device 48.

FIG. 2 shows that a raw material 50 in a liquid state is injected into the cavity 42 from the raw material supply system 34. The raw material 50 may be plastic, resin or any suitable material to make a vehicle piece or the pieces other than the vehicle pieces. Also shown in FIG. 2 is a weakening insert 52 disposed in the core 46. The weakening insert 52 may be configured to have a profile of a weakening portion of a molded piece. In some embodiments, the weakening insert 52 may be made of metal such as steel. The weakening insert 52 may be movable within the core 46 independently. In some embodiments, the weakening insert 52 may be moved by an actuator powered by a hydraulic power or an electric drive such as a motor (not shown). FIG. 2 shows that the weakening insert 52 is in a non-working condition where it does not project away from a surface of the core 46.

FIG. 2 and FIG. 3 further show valve pins 54 disposed on the core 46. The valve pins 54 may be fluidly connected to the external gas system 36. The external gas system 36 may supply an inert gas such as nitrogen to the cavity 42 from a gas inlet 55 during the molding process. In some embodiments, the external gas system 36 may include a nitrogen generator or a nitrogen supply system (not shown) and a valve 56 to regulate the gas supply. In some embodiments, the external gas system 36 may be connected to a controller as described in detail below.

In the gas injection process illustrated in FIG. 3, the cavity 42 is substantially filled up with the raw material 50 to form the injection molded piece 44. For the simplicity of description, the injection molded piece 44 refers to the piece in a liquid state and a solid state. The weakening insert 52 may be inserted into the injection molded piece 44 while it is in the liquid state. The insertion of the weakening insert 52 may create a space in the injection molded piece and form a weakened portion on the molded piece 44.

The inert gas such as nitrogen may be injected into a first surface 60 of the injection molded piece 44. Nitrogen may be applied to the first surface 60 as a thin film. The airflow is shown by arrows. However, it should be appreciated that the air may flow in any direction depending on the location of valve pins on the core 46 and/or a gas injection pattern. Further, it should be appreciated that the space for gas flow is depicted for illustration purpose and not in scale.

FIG. 3 further shows that a temperature sensor 51 disposed on the core 46 to detect a temperature of the cavity 42 or the temperature of the injection molded piece 44. In some embodiments, a pressure sensor 53 may be disposed on the core 46 to detect a gas pressure in the cavity 42. The detected temperature and/or pressure may be used to control the insertion of the weakening insert 52 into the injection molded piece and the gas supply to the cavity 42.

Figure 4:
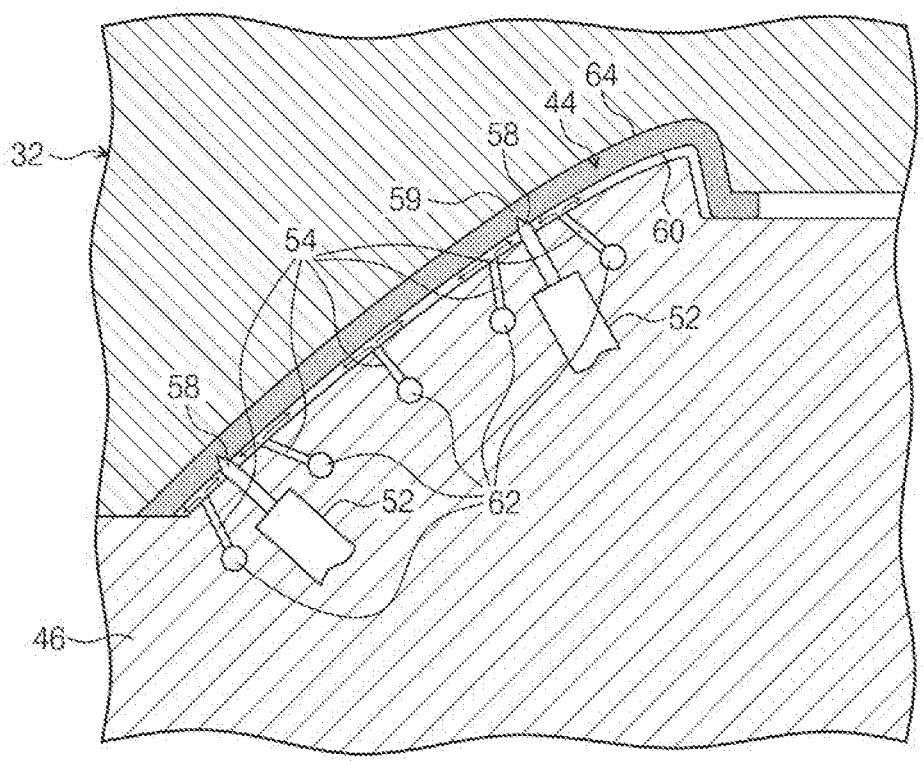
FIG. 4 is an enlarged cross-sectional view of a moveable mold part in FIG. 3, illustrating valve pins and a weakening insert disposed on a core of the moveable mold part.

FIG. 4 is an enlarged partial cross-sectional view of the mold 32 in FIG. 3, illustrating valve pins 54 and the weakening inserts 52 disposed on the core 46 of the moveable mold part 40. In some embodiments, the weakening insert 52 may include a sharp point at an end portion 58 and the insertion of the end portion 58 into the injection molded piece 44 creates a portion with reduced thickness, i.e., the weakened portion. The weakening insert 52 may be configured to have a profile of the weakened portion 59. In some embodiments, the weakening inserts 52 may be a frame and the weakened portion thus formed may consist of a continuous groove recessed from the first surface 60. In some embodiments, the weakening insert 52 may include a plurality of rods with sharp points and the weakened portion thus formed may consist of a plurality of slots or through-holes.

In some embodiments, the valve pins 54 may inject the gas in a manner to maintain a predetermined pressure above the first surface 60 of the molded piece 44. The valve pins 54 may be connected to gas channels 62 that may be disposed in the core 46 and are communicated fluidly with the external gas system 36. The gas applies pressure from the first surface 60 to a second surface 64 opposite the first surface 60. In some embodiments, a gas pressure may be controlled and the gas is injected directly through valve pins to specific areas of the first surface 60. In some embodiments, the gas pressure may be injected toward an entire first surface 60 via the valve pins. The gas pressure may push the raw material or the injection molded piece in the liquid state to the second surface 64 to make the second surface having desired surface quality. For example, the sink marks may be biased to the first surface 60. As a result, the surface imperfection on the second surface such as the sinks, blemishes or flow lines can be reduced significantly or eliminated.

It should be appreciated that any suitable gas injection device may be used in the external gas system. For example, a gas chamber with a plurality of injection holes may be attached to a core of the moveable mold part. The gas supply may be controlled by a valve in the external gas system. An area of the gas chamber may cover a predetermined portion of a surface of the molded piece. The gas may be injected to the surface of the molded piece from the injection holes.

Figure 5:
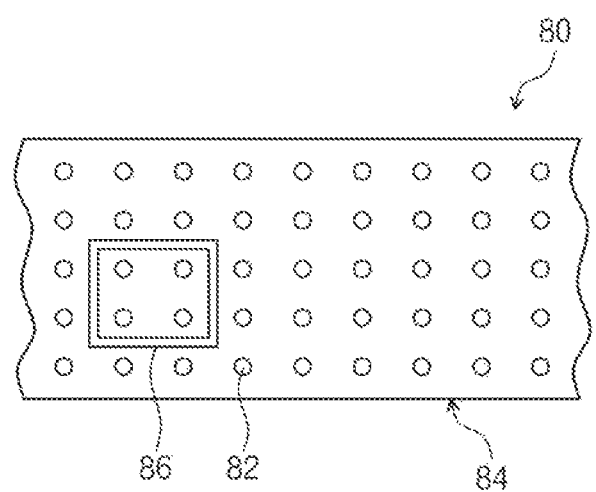
FIG. 5 is a plan view of a mold, illustrating valve pins and a weakening insert disposed on a core of a moveable mold part according to an example embodiment of the present disclosure.

FIG. 5 is a plan view of a moveable mold part 80 of an example injection molding system according to an example embodiment of the present disclosure. As shown in FIG. 5, a plurality of valve pins 82 may be disposed on a core 84 of the moveable part 80 and may be connected fluidly with gas channel (not shown). An inert gas such as nitrogen may be released from the valve pins 82. In some embodiments, the valve pins 82 may be disposed on a specific area of the core 84. In some embodiments, the valve pin 82 may be disposed on an area that substantially covers an injection molded piece so that the gas is injected evenly to an entire surface of the molded piece.

A weakening insert 86 may be disposed in the core 84 and movable within the core 84. The weakening insert 86 may be moved by an actuator controlled by a controller of the injection molding system. In the depicted embodiment, the weakening insert 86 consists of a frame having a rectangular shape to form the weakened portion having a corresponding rectangular shape. It should be appreciated that the weakening insert 86 may have any configuration that corresponding to a profile required for the weakened portion in the injection molded piece.

Figure 6:
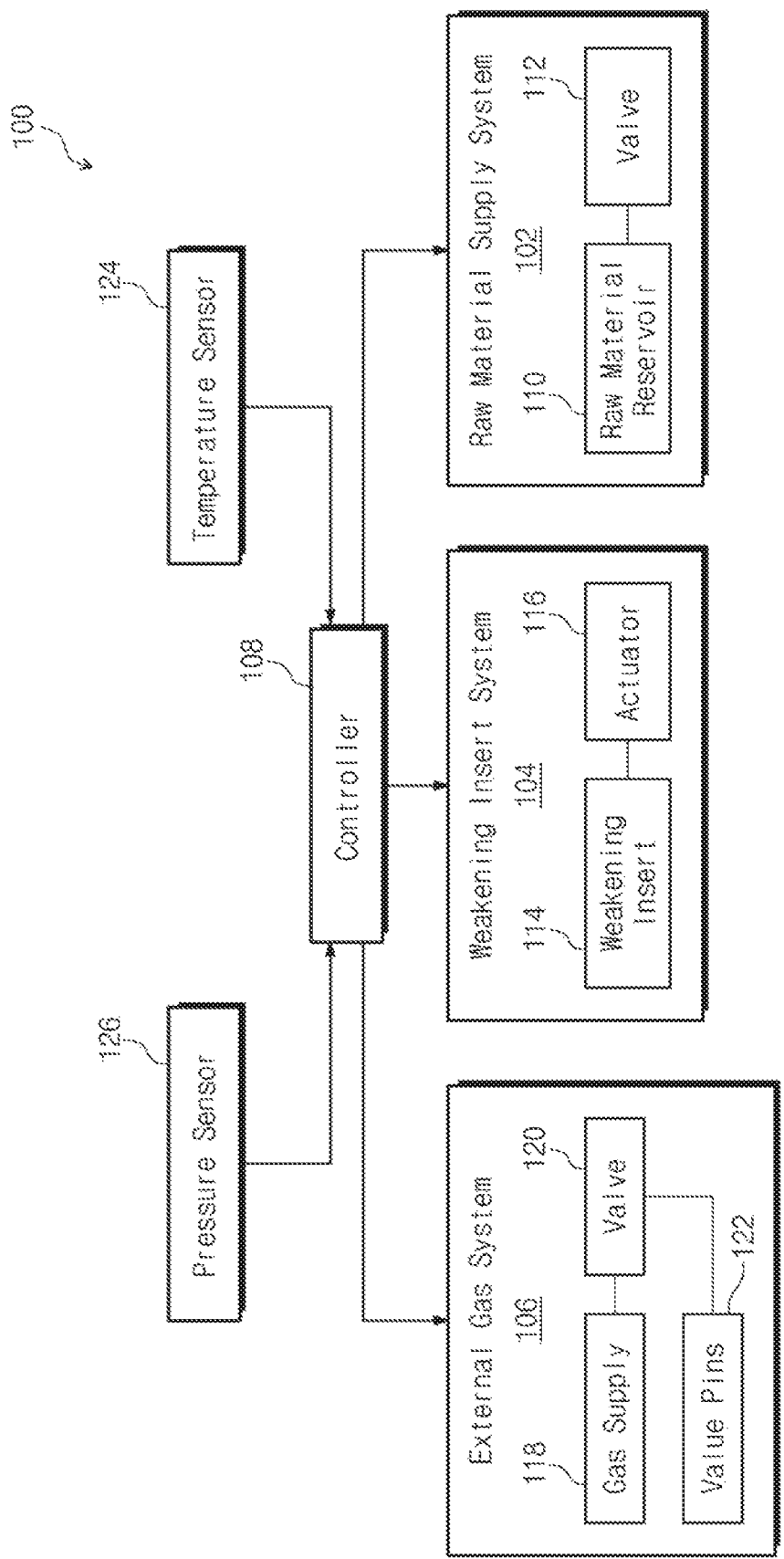
FIG. 6 is a schematic block diagram of an example injection molding system according to an example embodiment of the present disclosure.

FIG. 6 is a schematic block diagram of an example injection molding system 100. The injection molding system 100 may include a raw material supply system 102, a weakening insert system 104 and an external gas system 106, which may be controlled by a controller 108. The raw material supply system 102 may include a reservoir 110 that contains the raw material to form an injection molded piece and a valve 112 to control an injection of the raw material into a cavity of a mold and termination of the raw material supply. In some embodiments, the controller 108 may control an opening and closing of the valve 112 to control an amount of raw material injected into the cavity of a mold.

The weakening insert system 104 may include a weakening insert 114 to be moved by an actuator 116. The actuator 116 may be an electric motor or a hydraulic device that can move the weakening insert 114 into and out of the injection molded piece. The actuator 116 may be controlled to push the weakening insert 114 into the injection molded piece that is in a liquid state and pull at an end of a cooling cycle or close to the end of the cooling cycle by the controller 108. The end of the cooing cycle may be the time when the injection molded piece is substantially solidified.

The external gas system 106 may include a gas supply 118 which may be a gas generator or a reserve to generate or contain an inert gas such as nitrogen and a gas valve 120 to regulate the gas supply. The opening and closing of the gas valve 120 may be controlled by the controller 108. In some embodiments, the external gas system 106 may include valve pins 122 disposed on a core of the mold. The gas may be released to the cavity of the mold from the valve pins. In some embodiments, the external gas system may include a gas chamber disposed on the core. The gas chamber may include a plurality of injection holes and the gas may be injected into the cavity from the injection holes. In some embodiments, the gas may be introduced to the cavity by a gas inlet disposed on a body of the core.

The injection molding system 100 may further include a temperature sensor 124 disposed on the core of the mold to detect a temperature of the cavity or the temperature of the injection molded piece. In some embodiments, the temperature sensor 124 may be disposed on the mold body (e.g., a fixed mold part). The temperature of the mold body may correlate to the temperature of the injection molded piece in the cavity. The controller 108 may control the insertion of the weakening insert 114 in response to the detected temperature of the cavity, the detected temperature of the injection molded piece or the detected temperature of the mold body.

Similarly, in some embodiments, controller 108 may control the gas supply in response to the detected temperature in the cavity, the detected temperature of the molded piece, or the detected temperature of the mold body.

The injection molding system 100 may further include a pressure sensor 126 disposed on the core to measure a gas pressure in the cavity. The gas pressure in the cavity may be controlled based on a detected pressure so that a desired gas pressure may be feedback controlled to maintain a constant pressure against a surface of the molded piece facing the core.

The controller 108 may be a microcomputer including a microprocessor unit, input/output ports, read-only memory, random access memory, keep alive memory and a data bus. The controller 108 is shown to receive signals from the temperature sensor 124 and the pressure sensor 126. In some embodiments, the controller 108 may control the movement of the weakening insert 114, the gas supply, and raw material supply and other operations based on a molding condition such as an amount of raw material in the cavity, temperature and/or pressure in the cavity. In some embodiments, the controller 108 may control the movement of the weakening insert 114, the insert gas supply, and raw material supply and other operations according to operation parameters predetermined for a specific process.

FIG. 7 is a flowchart of a method 200 to fabricate an injection molded piece with a weakened portion in an injection molding system. The injection molded piece may include, but not limited to, an instrument panel, a pillar trim, a door panel, a quarter panel and a headliner in a vehicle. The weakened portion may be configured for airbag deployment. The method 200 may also be used to make the piece having a weakened portion other than the vehicle pieces. In some embodiments, the injection molding system may be the systems 30, 80 or 100 described above. It should be appreciated that the molding system may not be limited to the example embodiments. At 210, method 200 may include injecting raw material in a liquid state into a cavity of a mold to form the injection molded piece. As described above with reference to FIGS. 2 and 3, the cavity may be defined by a fixed mold part and a core of a moveable mold part of the injection molding system. The raw material may be plastic or resin or any suitable material to form the injection molded piece. When the raw material substantially fills the cavity, the injection molded piece may be formed. For the simplicity, the injection molded piece is used in description of the method when the raw material filled up the cavity no matter it is in a liquid state or in a solid state.

At 220, method 200 may include pushing a weakening insert into an injection molded piece at a first molding condition. In some embodiments, the first molding condition may be a first solidifying status or a hardening status of the injection molded piece. The solidifying status of the injection molded piece may be indicated by a temperature. As described above, the temperature of the injection molded piece may be detected directly by a temperature sensor disposed in the cavity of the mold or may be inferred from a temperature sensor disposed on a mold body. A temperature decreased from the initial raw material temperature may indicate the extent of solidification for a certain raw material. In some embodiments, the first molding condition may be met when the detected temperature equals to a first preset temperature or in a predetermined range. When the detected temperature is less than the first preset temperature, it may become difficult to insert the weakening insert or may require additional gas pressure later to push the injection molded piece against a surface opposite the gas injection surface. As described below, in some embodiments, the gas injection may start before the insertion of the weakening insert. At this operation scenario, the first molding condition may be met when both the gas pressure in the cavity and the temperature of the injection molded piece reach its preset value, respectively.

The weakening insert may be disposed in a core of the moveable mold part and may be moved by an actuator. The actuator may be a hydraulic powered drive or an electric drive and may be coupled to the moveable mold part. The movement of the weakening insert is independent to the movement of the core which is moved by a push and pull device.

At 230, method 200 may include injecting a gas to a first surface of the injection molded piece at a second molding condition. The first surface may face the moveable mold part. In some embodiments, the second molding condition may be a second solidifying status of the injection molded piece indicated by a second preset temperature. As described above, the temperature of the injection molded piece may be detected directly by a temperature sensor disposed on the cavity of the mold or may be inferred from a temperature sensor disposed on a body of the mold. The second preset temperature may be the same as the first preset temperature for the first molding condition. In other words, the insertion of the weakening insert and the gas injection may start simultaneously. In some embodiments, the second preset temperature may be greater than the first preset temperature. That is, the gas injection starts before the insertion of the weakening insert. In some embodiments, the second preset temperature may be less than the first preset temperature. That is, the gas injection starts after the insertion of the weakening insert.

In some embodiments, the second molding condition may be a predetermined depth that the weakening insert is in the injection molded piece. In one example, the predetermined depth may be a maximum depth that the weakening insert is pushed into the injection molded piece. In other words, the gas injection may start when the insertion of the weakening insert has been completed or after a certain time period when the insertion of the weakening insert has been completed. In another example, the predetermined depth may be a depth less than the maximum depth. In other words, the gas injection may start before the completion of the insertion of the weakening insert into the injection molded piece. The insertion depth may be determined from a controller that controls the movement of the weakening insert.

The gas injected may be an inert gas such as nitrogen and may be supplied from an external gas system of the injection molding system. In some embodiments, the gas pressure in the cavity may be maintained at a constant pressure during the gas injection process. In some embodiments, the gas may be released to the first surface of the injection molded piece via valve pins that are disposed on an area of the core of the moveable part. The gas pressure may be controlled by a controller via a valve upstream of the valve pins.

In some embodiments, the gas pressure in the cavity may be maintained at different values at different stages of the molding process. For example, the gas may be injected before the insertion of the weakening insert during a first gas injection stage. At the first gas injection stage, the gas pressure in the cavity may be maintained at a first value. After the insertion of the weakening insert, the gas pressure in the cavity may be maintained at a second value different from the first value at a second gas injection stage. In one example, the second value may be greater than the first value.

At 240, method 200 includes stopping gas supply after a cooling cycle is completed or the injection molded piece is solidified.

At 250, method 200 may include pulling the moveable mold part away from the fixed mold part and ejecting the injection molded piece.

According to another aspect of the present invention, a method is provided to fabricate an injection molded piece with a weakened portion in an injection molding system. The injection molding system may include a cavity defined by a fixed mold part and a core of a moveable mold part. The method may comprise injecting raw material in a liquid state into the cavity of a mold to form the injection molded piece; pushing a weakening insert into the injection molded piece to form the weakened portion while the injection molded piece is at a first solidifying status; and injecting a gas to an invisible surface of the injection molded piece at a second solidifying status. The invisible surface faces a moveable mold part.

In some embodiments, the first and second solidifying statuses may be indicated by a temperature. In some embodiments, the first and second solidifying statutes may be inferred from a time has passed since the injection of the raw material into the cavity for a specific raw material.

In the molding process of the present disclosure, a gas applies pressure to a first surface of the injection molded piece that faces the gas injection while the injection molded piece is in the liquid state during a cooling cycle and forces the injection molded piece against a second surface opposite the first surface. In this way, the visible imperfection that could appears on the second surface may be significantly reduced or eliminated. For example, the gas pressure may bias the sinks to the first surface and thus eliminating surface imperfections on the second surface due to thickness variations caused by the weakening insert.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into computer readable storage medium in the engine control system.

It will be appreciated that the configurations and routines disclosed herein are exemplary in nature, and that these specific embodiments are not to be considered in a limiting sense, because numerous variations are possible.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A method to fabricate an injection molded piece with a weakened portion in an injection molding system, the injection molding system including a cavity defined by a fixed mold part and a moveable mold part, the method comprising:

injecting raw material in a liquid state into the cavity to form the injection molded piece;

moving a weakening insert into the injection molded piece from a first surface of the injection molded piece, wherein the first surface faces the moveable mold part; and injecting a gas to the first surface of the injection molded piece; wherein the gas is controlled being injected at a first value at a first gas injection stage and injected at a second value at a second gas injection stage;

wherein moving the weakening insert into the injection molded piece and injecting the gas are performed while the injection molded piece is in the liquid state; and wherein the second gas injection stage starts after an insertion of the weakening insert into the injection molded piece and the second value is greater than the first value.

2. The method of claim 1, wherein the raw material is plastic and the gas is an inert gas.

3. The method of claim 2, wherein the gas is injected to the first surface of the injection molded piece via a plurality of valve pins disposed on a core of the moveable mold part, and wherein the gas applies a force to a second surface of the injection molded piece that is opposite to the first surface.

4. A method to fabricate an injection molded piece with a weakened portion in an injection molding system, the injection molding system including a cavity defined by a fixed mold part and a moveable mold part, the method comprising:

injecting raw material in a liquid state into the cavity of a mold to form the injection molded piece;

pushing a weakening insert into the injection molded piece to form the weakened portion; and injecting a gas to a first surface of the injection molded piece, wherein the first surface faces a moveable part of the mold, and the gas is injected after the weakening insert is pushed into the injection molded piece; and determining an insertion depth of the weakening insert into the injection molded piece and injecting the gas to the first surface of the injection molded piece when the insertion depth reaches a predetermined depth.

5. The method of claim 4, wherein the weakening insert is coupled to the moveable part of the mold, and is pushed into the injection molded piece by an actuator.

6. The method of claim 4, further comprising stopping the gas injection after a cooling cycle is completed, pulling the moveable mold part away from the fixed mold part, and ejecting the injection molded piece by a core pull and push device.

7. The method of claim 4, wherein the weakening insert creates a continuous groove or a plurality of slots on the first surface to form the weakened portion.

8. The method of claim 4, wherein the gas is a nitrogen and wherein the gas is injected as a thin layer on the first surface of the injection molded piece and applies a force to a second surface that is opposite to the first surface.

9. The method of claim 4, wherein the gas is injected by a plurality of valve pins disposed on a specific area on a core of the moveable mold part.

10. The method of claim 9, further comprising controlling a gas pressure in the cavity during gas injection to be substantially constant, wherein the gas pressure is controlled by a controller via a valve upstream of the valve pins.

11. The method of claim 4, wherein the injection molded piece is an instrument panel in a vehicle and the weakened portion is configured for airbag deployment.

12. The method of claim 4, wherein the injection molded piece is a trim piece in a vehicle and the weakened portion is configured for airbag deployment.

13. The method of claim 4, wherein the predetermined depth is a maximum depth that the weakening insert is pushed into the injection molded piece.

14. The method of claim 4, wherein the predetermined depth is a depth less than a maximum depth that the weakening insert is pushed into the injection molded piece.

* * * * *